United States Patent
Damnjanovic et al.

(10) Patent No.: US 9,998,960 B2
(45) Date of Patent: Jun. 12, 2018

(54) ACTIVATION PROCEDURE FOR DORMANT CELLS

(71) Applicant: QUALCOMM Incorporated, San Diego, CA (US)

(72) Inventors: Aleksandar Damnjanovic, Del Mar, CA (US); Durga Prasad Malladi, San Diego, CA (US); Yongbin Wei, San Diego, CA (US); Wanshi Chen, San Diego, CA (US); Peter Gaal, San Diego, CA (US); Tao Luo, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 14/944,131

(22) Filed: Nov. 17, 2015

(65) Prior Publication Data

US 2016/0073303 A1    Mar. 10, 2016

Related U.S. Application Data

(63) Continuation of application No. 14/166,104, filed on Jan. 28, 2014, now Pat. No. 9,264,951.

(Continued)

(51) Int. Cl.
*H04W 4/00* (2018.01)
*H04W 36/00* (2009.01)
(Continued)

(52) U.S. Cl.
CPC ... *H04W 36/0061* (2013.01); *H04W 36/0055* (2013.01); *H04W 36/08* (2013.01);
(Continued)

(58) Field of Classification Search
CPC .. Y02B 60/50; H04W 52/0206; H04W 48/16; H04W 88/08; H04W 76/046;
(Continued)

(56) References Cited

U.S. PATENT DOCUMENTS 5,706,283 A    1/1998  Suzuki
9,264,951 B2 *    2/2016  Damnjanovic ... H04W 52/0206
(Continued)

FOREIGN PATENT DOCUMENTS

CN    102714812 A    10/2012
JP    2010506446 A    2/2010
(Continued)

OTHER PUBLICATIONS

Huawei, Hisilicon, "Discussion on Dual Dormant/Active State Cells and Cell Discovery", 3GPP TSG RAN WG1#72 R1-130447, URL:http://www.3gpp.org/ftp/tsg_ran/WG1_RL1/TSGR1_72/Docs/R1-130447.zip, Jan. 19, 2013.
(Continued)

*Primary Examiner* — Michael J Moore, Jr.
(74) *Attorney, Agent, or Firm* — Arent Fox, LLP

(57) ABSTRACT

In an aspect of the disclosure, a method, a computer-readable medium, and an apparatus are provided. The apparatus may be a second base station. The second base station receives a measurement report and a cell identifier, associated with a first base station, from a UE. The second base station determines, based on the cell identifier, that the first base station is in a dormant state. The second base station sends an activation request to the first base station, based on the measurement report, to prompt the first base station to transition from the dormant state to an active state. The second base station further includes handing off the UE to the first base station.

27 Claims, 13 Drawing Sheets

Related U.S. Application Data

(60) Provisional application No. 61/765,663, filed on Feb. 15, 2013.

(51) Int. Cl.
  *H04W 52/02* (2009.01)
  *H04W 36/08* (2009.01)
  *H04W 56/00* (2009.01)

(52) U.S. Cl.
  CPC ..... *H04W 52/0206* (2013.01); *H04W 56/001* (2013.01); *H04W 76/10* (2018.02); *H04W 76/27* (2018.02); *H04W 76/28* (2018.02); H04W 36/0072 (2013.01); Y02D 70/00 (2018.01); Y02D 70/1222 (2018.01); Y02D 70/1242 (2018.01); Y02D 70/1262 (2018.01); Y02D 70/142 (2018.01); Y02D 70/146 (2018.01)

(58) Field of Classification Search
  CPC ... H04W 16/32; H04W 72/042; H04W 24/02; H04W 24/10; H04W 84/045; H04W 72/0406; H04W 92/20; H04W 74/0833; H04W 76/021; H04W 36/00
  See application file for complete search history.

(56) References Cited

U.S. PATENT DOCUMENTS

| | | | |
|---|---|---|---|
| 9,807,687 B2* | 10/2017 | Awoniyi-Oteri | H04W 52/0212 |
| 2007/0066273 A1 | 3/2007 | Laroia et al. | |
| 2009/0181661 A1 | 7/2009 | Kitazoe et al. | |
| 2011/0039546 A1 | 2/2011 | Narasimha et al. | |
| 2012/0015657 A1 | 1/2012 | Comsa et al. | |
| 2012/0106349 A1* | 5/2012 | Adjakple | H04W 52/0206 370/241 |
| 2012/0106423 A1 | 5/2012 | Nylander et al. | |
| 2012/0320874 A1 | 12/2012 | Li et al. | |
| 2013/0010964 A1 | 1/2013 | Fong et al. | |
| 2013/0252660 A1* | 9/2013 | Bach | H04W 52/0206 455/525 |
| 2014/0146680 A1* | 5/2014 | Wang | H04W 52/0206 370/236 |
| 2014/0185530 A1 | 7/2014 | Kuchibhotla et al. | |
| 2014/0235243 A1 | 8/2014 | Damnjanovic et al. | |
| 2015/0223185 A1* | 8/2015 | Harris | G01S 5/0236 455/456.5 |
| 2017/0111884 A1* | 4/2017 | Sadeghi | H04W 68/02 |

FOREIGN PATENT DOCUMENTS

| | | | |
|---|---|---|---|
| JP | 2012512591 A | 5/2012 | |
| JP | 2012518327 A | 8/2012 | |
| JP | 2013528959 A | 7/2013 | |
| WO | 2010100820 A1 | 9/2010 | |
| WO | 2011085238 A2 | 7/2011 | |
| WO | 2011119889 A1 | 9/2011 | |
| WO | 2011125640 A1 | 10/2011 | |
| WO | 2012118740 A1 | 9/2012 | |

OTHER PUBLICATIONS

Qualcomm Incorporated, "Small Cell Discovery[online]", 3GPP TSG-RAN WG1#72b R1-131408, URL:http://www.3gpp.org/ftp/tsg_ran/WG1_RL1/TSGR1_72b/Docs/R1-131408.zip, Apr. 2013.

Qualcomm Incorporated, "Small Cell Discovery", 3GPP Draft; R1-132494, 3GPP TSG-RAN WG1 #73, Fukuoka, Japan; May 20-24, 2013, XP050698212, 6 Pages. Retrieved from the Internet:URL:http ://www.3gpp.org/ftp/tsg_ran/WG 1_ RL 1 /TSG R 1_73/Docs/.

Samsung, "Evaluation Assumptions for Discovery of Small Cells" 3GPP TSG-RAN WG1#72 R1-130300, URL:http://www.3gpp.org/ftp/tsg_ran/WG1_RL1/TSGR1_72/Docs/R1-130300.zip, Jan. 19, 2013.

Translation of First Office Action for Japanese Patent Application No. 2015-558022 dated May 17, 2016, 6 pages.

"3rd Generation Partnership Project; Technical Specification Group Radio Access Network; Evolved Universal Terrestrial Radio Access (E-UTRA); Potential solutions for energy saving for E-UTRAN (Release 11)", 3GPP Standard; 3GPP TR 36.927, 3rd Generation Partnership Project (3GPP), Mobile Competence Centre ; 650, Route Des Lucioles ; F-06921 Sophia-Antipolis Cedex; France, vol. RAN WG3, No. V11.0.0, Sep. 22, 2012 (Sep. 22, 2012), pp. 1-22, XP050649880, [retrieved on Sep. 22, 2012], paragraph [0006].

International Search Report and Written Opinion—PCT/US2014/013651—ISA/EPO—Apr. 14, 2014.

3GPP TS 36.300 V9.0.0 (Jun. 2009), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).

Alcatel-Lucent Shanghai Bell, et al., "Mobility in the presence of NodeB DTX", 3GPP TSG-RAN WG1#60bis R1-101846, Apr. 2010, pp. 1-4, URL: http://www.3gpp.org/ftp/tsg_ran/WG1_RL1/TSGR1_60b/Docs/R1-101846.zip.

European Search Report—EP17191052—Search Authority—The Hague—Nov. 10, 2017.

Mediatek Inc: "Methods for Efficient Discovery of Small Cells", 3GPP Draft, R1 -130225 V3, 3rd Generation Partnership Project (3GPP), Mobile Competence Centre, 650, Route Des Lucioles, F-06921 Sophia Antipolis Cedex, France. vol. RAN WG1, No. St Julian, Jan. 28, 2013—Feb. 1, 2013 Jan. 19, 2013 (Jan. 19, 2013), XP050663605, Retrieved from the Internet: URL: http://www.3gpp.org/ftp/tsg_ran/WG1_RL1/TSGR1_72/Docs/ [retrieved on Jan. 19, 2013].

Newpostcom: "Efficient Discovery of Small Cells", 3GPP Draft, R1-130188, 3rd Generation Partnership Project (3GPP), Mobile Competence Centre, 650, Route Des Lucioles, Sophia Antipolis Codex, France, vol. RAN WG1, No. 72, St Julian, Malta, Jan. 28, 2013—Feb. 1, 2018, Jan. 28, 2013 (Jan. 28, 2013), 2 pages.

* cited by examiner

ACTIVATION PROCEDURE FOR DORMANT CELLS

CROSS-REFERENCE TO RELATED APPLICATION(S)

This application is a continuation application of U.S. application Ser. No. 14/166,104, entitled ACTIVATION PROCEDURE FOR DORMANT CELLS, filed on Jan. 28, 2014, which claims the benefit of U.S. Provisional Application Ser. No. 61/765,663, entitled ACTIVATION PROCEDURE FOR DORMANT CELLS, filed on Feb. 15, 2013, both of which are expressly incorporated by reference herein in their entirety.

BACKGROUND

Field

The present disclosure relates generally to communication systems, and more particularly, to an activation procedure for dormant cells.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects of the present disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, according to an example, a method of wireless communication of a second base station is provided. The method includes receiving a measurement report and a cell identifier, associated with a first base station, from a user equipment (UE). The method also includes determining, based on the cell identifier, that the first base station is in a dormant state. The method further includes sending an activation request to the first base station, based on the measurement report, to prompt the first base station to transition from the dormant state to an active state. The method yet further includes handing off the UE to the first base station.

According to an example, an apparatus for wireless communication is provided. The apparatus may be a second base station. The apparatus includes means for receiving a measurement report and a cell identifier, associated with a first base station, from a UE. The apparatus also includes means for determining, based on the cell identifier, that the first base station is in a dormant state. The apparatus further includes means for sending an activation request to the first base station, based on the measurement report, to prompt the first base station to transition from the dormant state to an active state. The apparatus yet further includes means for handing off the UE to the first base station.

According to an example, an apparatus for wireless communication is provided. The apparatus may be a second base station. The apparatus includes a memory and at least one processor coupled to receive a measurement report and a cell identifier, associated with a first base station, from a UE. The at least one processor is also configured to determine, based on the cell identifier, that the first base station is in a dormant state. The at least one processor is further configured to send an activation request to the first base station, based on the measurement report, to prompt the first base station to transition from the dormant state to an active state. The at least one processor is yet further configured to hand off the UE to the first base station.

According to an example, a computer-readable medium storing computer executable code for a second base station is provided. The computer-readable medium includes code to receive a measurement report and a cell identifier, associated with a first base station, from a UE. The computer-readable medium also includes code to determine, based on the cell identifier, that the first base station is in a dormant state. The computer-readable medium further includes code to send an activation request to the first base station, based on the measurement report, to prompt the first base station to transition from the dormant state to an active state. The computer-readable medium yet further includes code to hand off the UE to the first base station.

DETAILED DESCRIPTION

Figure 1:
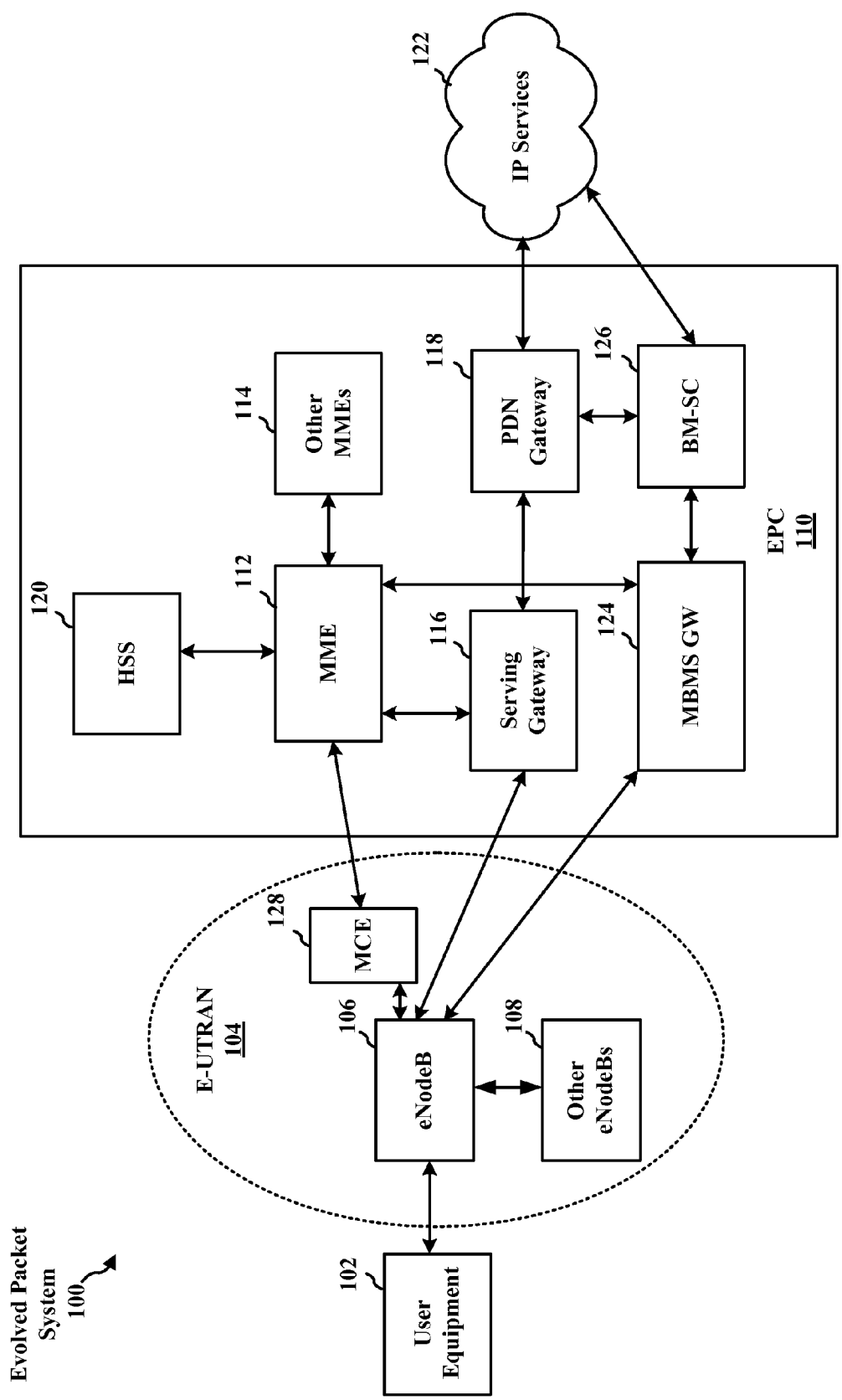
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
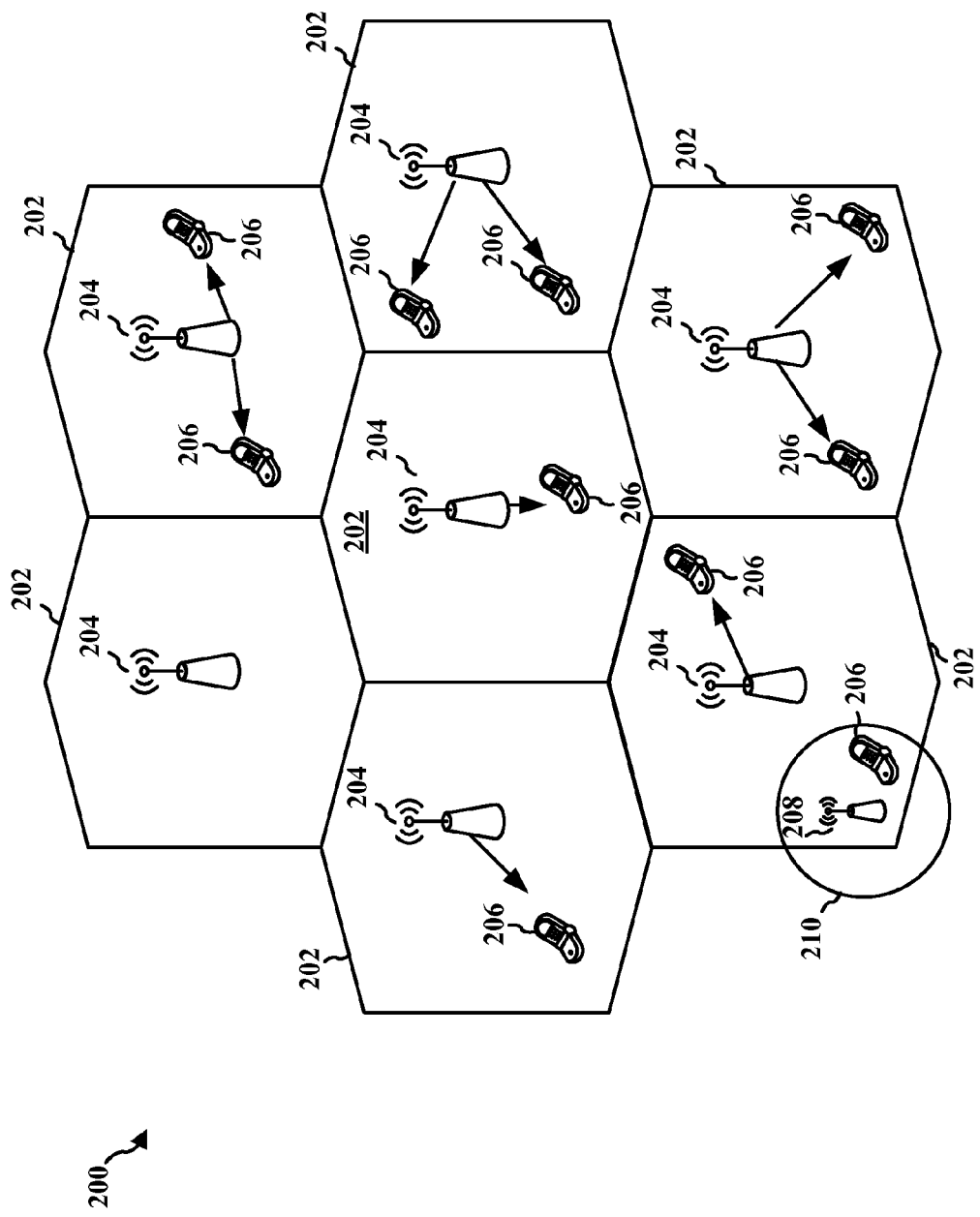
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE. 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
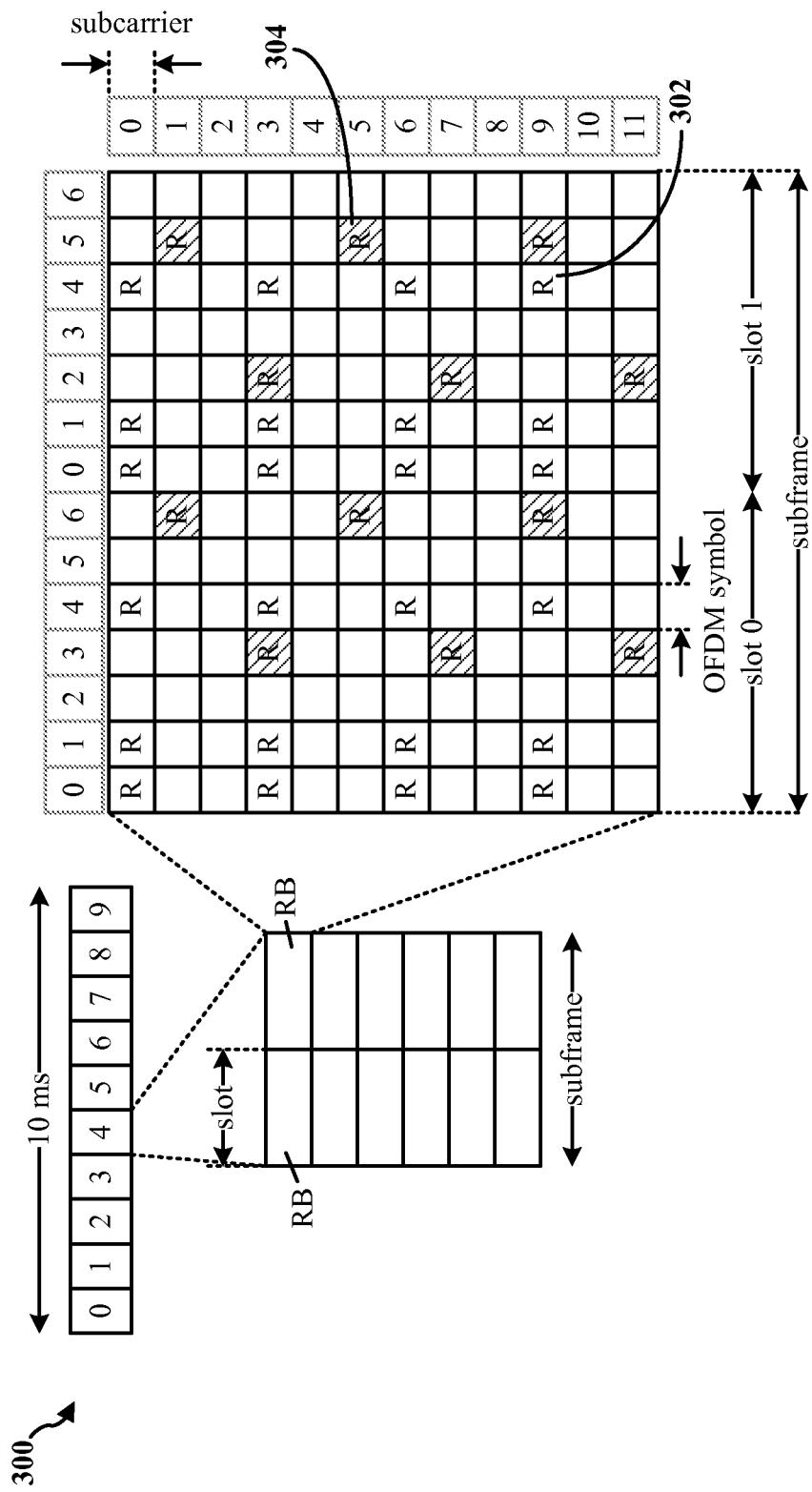
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
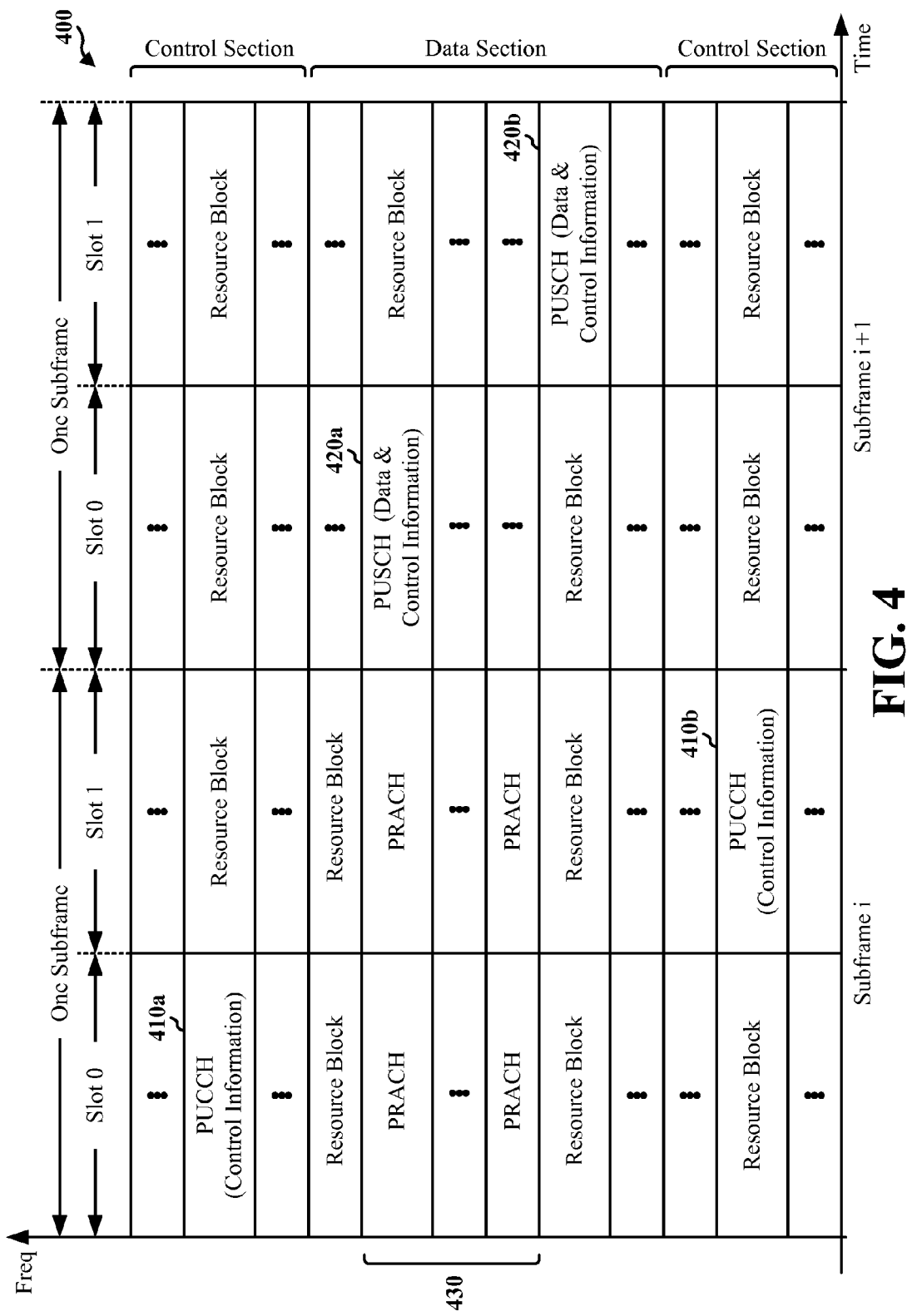
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
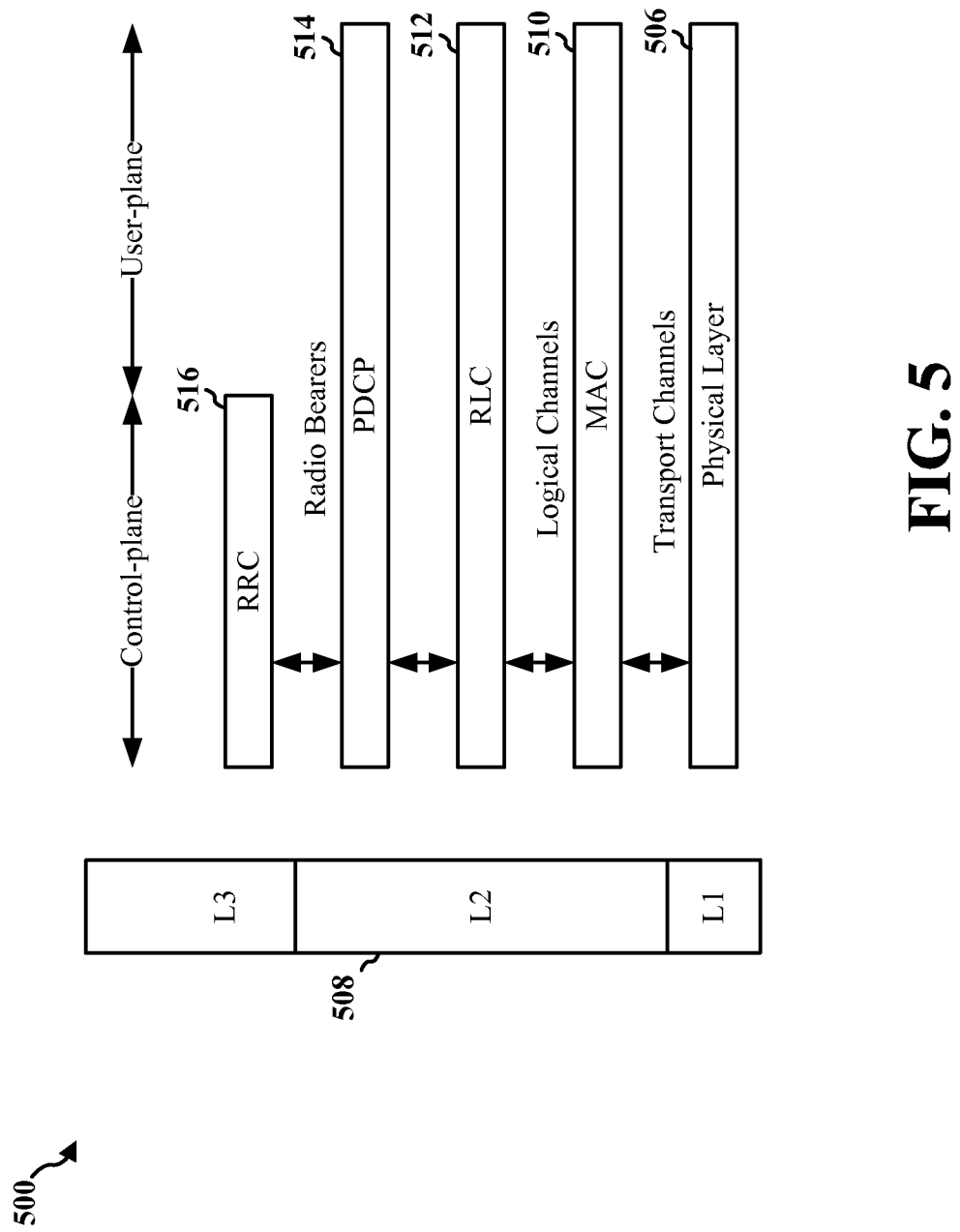
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
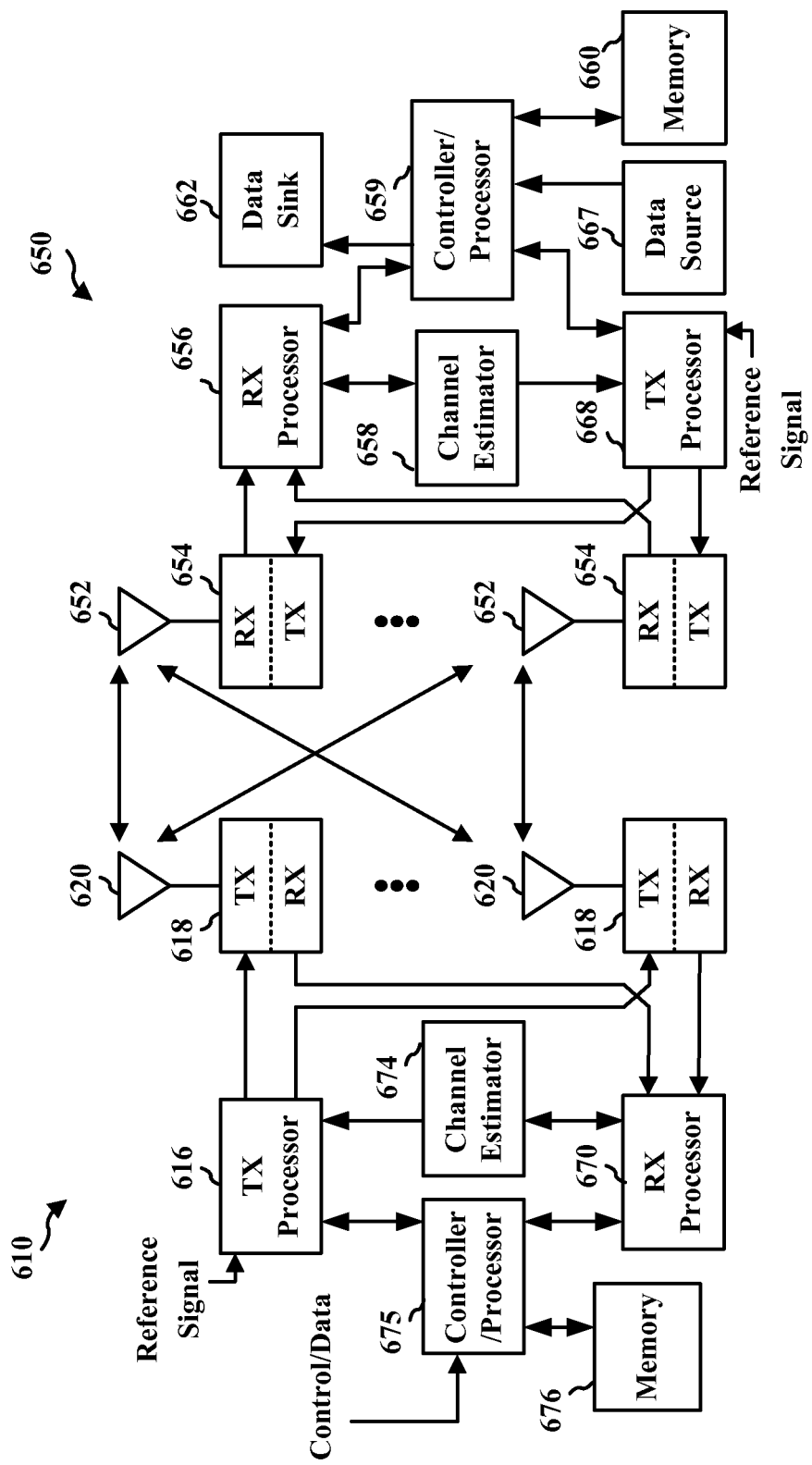
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Cells may be dormant or change to a dormant state (mode) to conserve power, reduce interference to neighboring cells and/or UEs served by neighboring cells, and/or reduce received handoffs of high mobility UEs that may be likely to experience a radio link failure (RLF) with the cell. A dormant cell may be referred to as a dormant eNB, a new carrier type (NCT) dormant eNB, or an NCT dormant cell. Idle UEs in an RRC idle state may not be allowed to access or to camp on the dormant eNB. There is currently a need for an activation procedure for activating a dormant eNB to serve a UE when the UE is not allowed to access or to camp on the dormant eNB.

Figure 7:
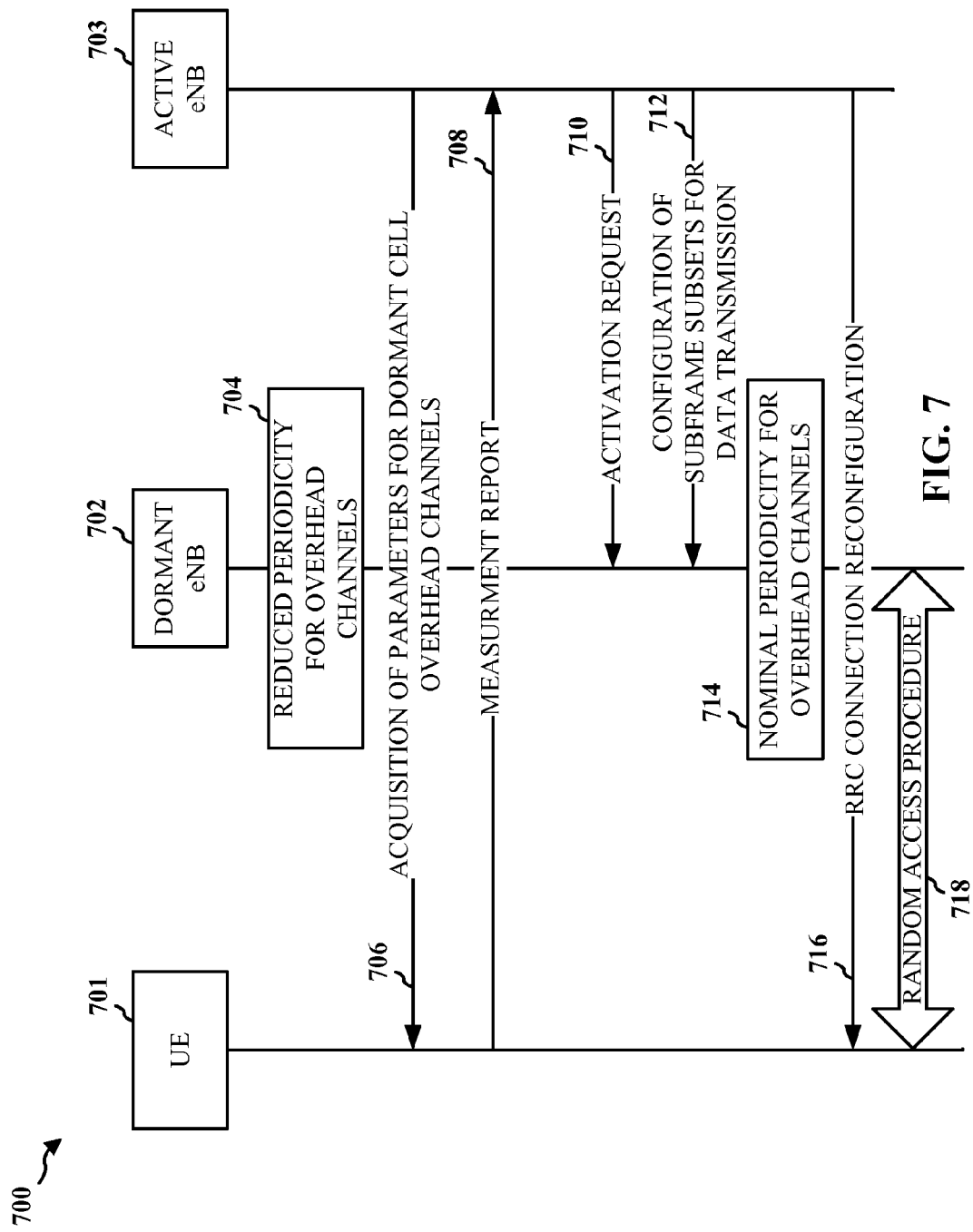
FIG. 7 is a call flow diagram illustrating an exemplary activation procedure for a dormant evolved Node B.

FIG. 7 is a call flow diagram 700 illustrating an exemplary activation procedure for a dormant eNB 702. The dormant eNB 702 transmits 704 sparse overhead signals on overhead channels. Overhead signals include a primary synchronization signal (PSS), secondary synchronization signal (SSS), CRS, a master information block (MIB), and system information blocks (SIBs). The dormant eNB 702 transmits the overhead signals on a small subset of subframes within each radio frame or within each of a plurality of radio frames. The sparse transmission of overhead signals contains sufficient information for allowing a UE 701 in an RRC connected state with an active eNB 703 (also referred to as a serving eNB) to detect, to measure, and to report the dormant eNB 702 to the active eNB 703. The activation procedure in the diagram 700 applies to RRC idle UEs that cannot camp on the dormant eNB 702 and cannot access the dormant eNB 702 after receiving a page from the active eNB 703.

The dormant eNB 702 sends overhead channel transmissions in bursts. The bursts are at a reduced periodicity. The dormant eNB 702 may transmit the PSS, SSS, CRS, MIB, and system information (SI) in SI blocks (SIBs) in N ms bursts every M ms with L ms offset. The values for N, M, and L may be configured by the active eNB 703. The active eNB 703 may configure the values for N, M, and L through a broadcast in SI and/or through unicast RRC signaling. The active eNB 703 may signal the UE 701 to look at multiple burst configurations to acquire the overhead signals from the dormant eNB 702. The System Frame Number (SFN) may be synchronized with neighboring cells by, for example, over-the-air (OTA) synchronization, backhaul based synchronization, or the like. Alternatively, the dormant eNB 702 may have an SFN/subframe offset from the neighboring cells.

The dormant eNB 702 may sparsely transmit a MIB and SIBs. The dormant eNB 702 may transmit only a subset of the information that the dormant eNB 702 normally transmits when active or in an active state. For example, the dormant eNB 702 may transmit a SIB 1 (SIB1) lite, which includes only a subset of the information normally included in a SIB1. Transmitting SI sparsely (with less periodicity) reduces the coverage of discovery of the dormant eNB 702.

The system bandwidth of the dormant eNB 702 may be the same as the active eNB 703. If the system bandwidth of the dormant eNB 702 is different, the system bandwidth of the dormant eNB 702 may be communicated in the MIB. The SFN/subframe offset of the dormant eNB 702 may be the same as the active eNB 703. If the SFN/subframe offset is different for the dormant eNB 702, the active eNB 703 may signal the difference to the UE 701. The dormant eNB 702 overhead channel transmission may include an indication that the eNB 702 is dormant or in a dormant state. The indication may be transmitted in a MIB, SI (e.g., SIB1), or SIB1 lite. The indication allows the UE 701 to determine on what subframes the UE 701 can detect the dormant eNB 702.

Referring again to FIG. 7, the UE 701 acquires 706 parameters for overhead channels of the dormant eNB 702 from the active eNB 703. The parameters indicate the resources (e.g., subframes, periodicity) on which the overhead signals can be obtained from the dormant eNB 702. On the indicated resources, the UE 701 receives the PSS and the SSS, and detects the dormant eNB 702 based on the received PSS and the SSS. On the indicated resources, the UE 701 also receives CRS and a cell identifier associated with the dormant eNB 702. The cell identifier may be a global cell identifier or an extended cell identifier. The UE 701 determines a reference signal received quality (RSRQ), a reference signal received power (RSRP), or a signal to interference plus noise ratio (SINR) of the CRS received at the burst locations (e.g., 10 ms every 200 ms). The UE 701 sends a measurement report 708 to the active eNB 703 including the RSRQ, RSRP, and/or SINR information. The measurement report 708 includes or is sent with the cell identifier of the dormant eNB 702.

The active eNB 703 receives the measurement report 708 and the cell identifier from the UE 701. Based on the measurement report 708, the active eNB 703 may determine whether to activate the dormant eNB 702 corresponding to the cell identifier, and hand over the UE 701 to the dormant eNB 702. Upon determining to activate the dormant eNB 702, the active eNB 703 sends an activation request 710 to the dormant eNB 702. The activation request 710 may include a configuration of the overhead channel transmissions (e.g., periodicity) when the eNB 702 is active or in an active state. Subsequently, the active eNB 703 may transmit a configuration 712 for subframe subsets that may be utilized by the dormant eNB 702 for data transmissions with the UE 701.

After receiving the activation request 710 from the active eNB 703, the eNB 702 changes to an active state, and transmits 714 overhead signals with a nominal periodicity. The eNB 702 transmits overhead signals in the active state with greater periodicity than when in the dormant state. After changing to the active state, the eNB 702 may indicate in the SI that the eNB 702 is in the active state rather than the dormant state. In particular, when in the active state, the eNB 702 may transmit a MIB including an active state indication, system bandwidth, and other information, such as a downlink control channel configuration, a SIB1 assignment, etc. The active state indication may include multiple bits to indicate different configurations (e.g., in terms of periodicity and/or bandwidth) of PSS, SSS, and reference signals, such as CRS, channel state information (CSI) reference signals (RS) (CSI-RS), or other reference signals. The nominal periodicity may be less than a periodicity at which overhead signals are transmitted by the active eNB 703. Transmitting overhead signals at less periodicity than the active eNB 703 may be useful in order to limit the interference to UEs being served by the active eNB 703, and may be useful to reduce the handover rate of high mobility UEs that have not yet been handed over to the eNB 702. High mobility UEs may have a greater likelihood of RLF at the eNB 702. Data transmissions may be limited at least initially to configured subframe subsets in order to avoid creating conditions that could lead to RLF of nearby UEs. Radio Resource Management (RRM) and Radio Link Management (RLM) on the active eNB 703 may also be limited to a set of subframes or resources when the eNB 702 does not transmit signals. Subsequently, the active eNB 703 hands off the UE 701 to the eNB 702. The UE 701 receives an RRC connection reconfiguration 716 from the active eNB 703, and performs a random access procedure 718 (e.g., PRACH procedure) with the eNB 702.

Figure 8:
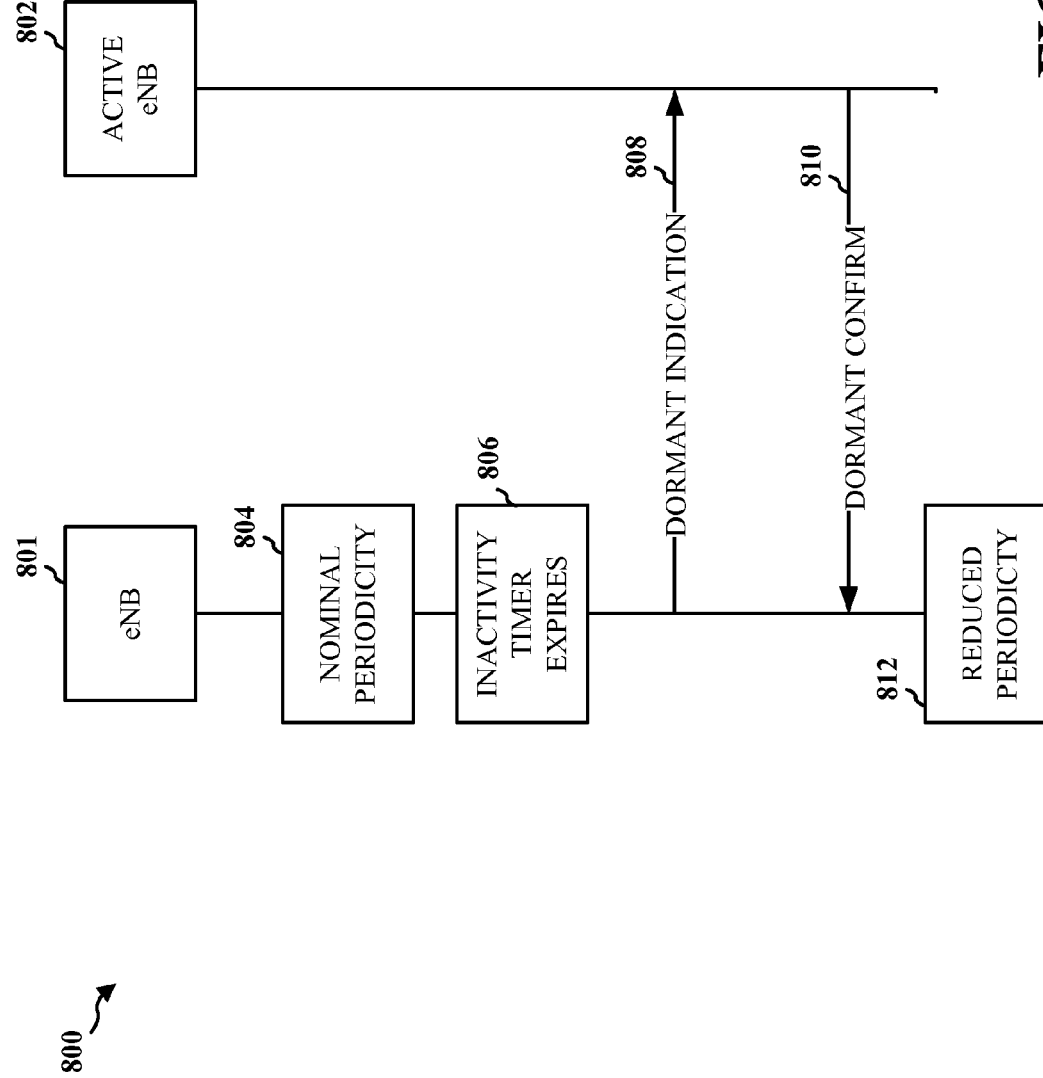
FIG. 8 is a call flow diagram illustrating an exemplary procedure for changing from an active state to a dormant state.

FIG. 8 is a call flow diagram 800 illustrating an exemplary procedure for changing from an active state to a dormant state. While active, the eNB 801 transmits 804 overhead signals with a nominal periodicity. Upon expiration of an inactivity timer 806, the eNB 801 may transmit an indication 808 of a desire to change to a dormant state to the active eNB 802. The active eNB 802 may then respond 810 to the eNB 801, confirming that the eNB 801 may transition from the active state to the dormant state. Subsequently, the eNB 801 transitions to a dormant state and transmits 812 overhead signals with a reduced periodicity. The eNB 801 may transition from the active state to the dormant state without informing the active eNB 802. When transmitting the dormant indication, the eNB 801 may include a proposed configuration for transmitting the overhead signals when in the dormant state. When sending the dormant confirmation, the active eNB 802 may confirm the received configuration from the eNB 801, or may request a different configuration for transmitting the overhead signals when in the dormant state.

Figure 9:
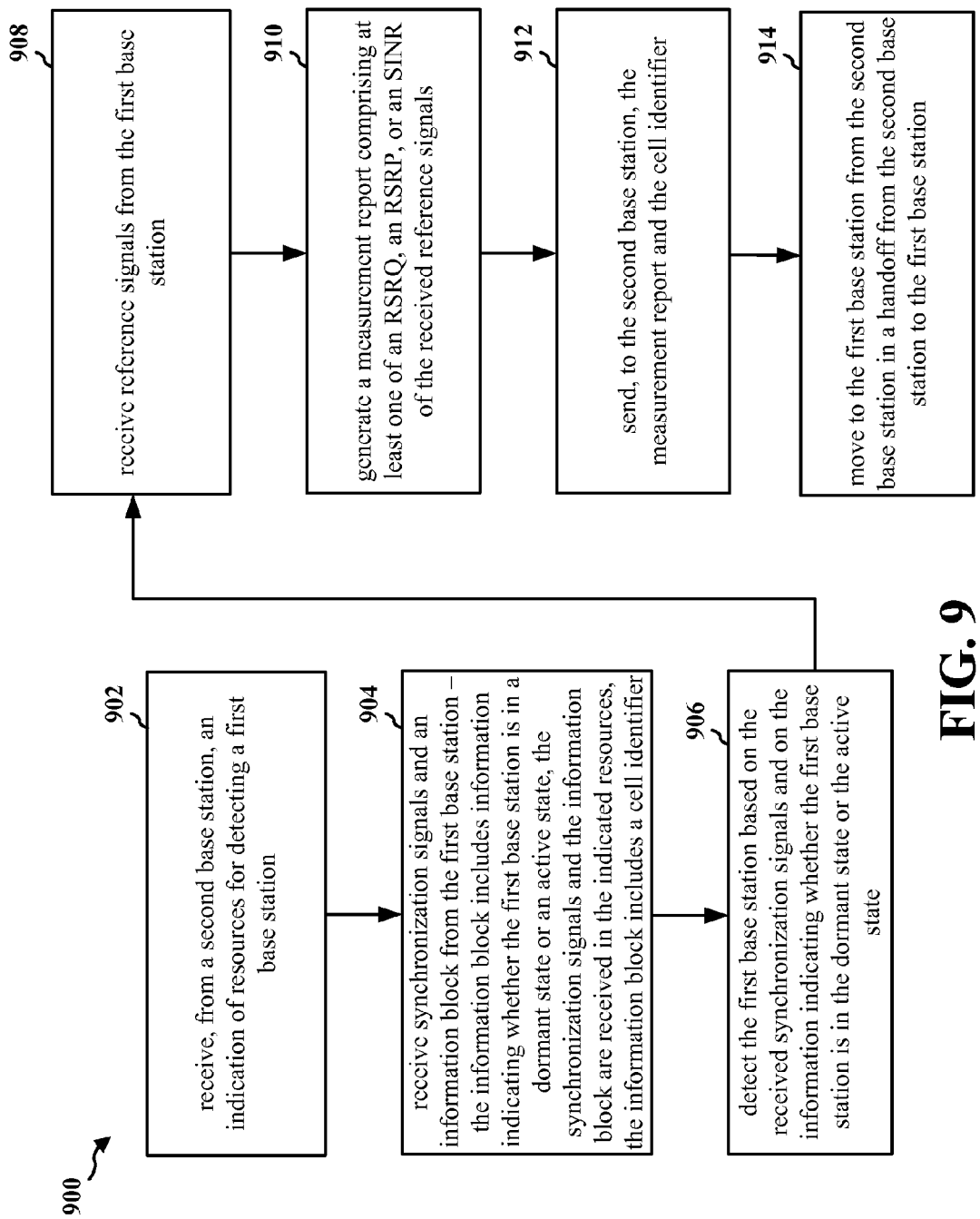
FIG. 9 is a flow chart of a first method of wireless communication.

FIG. 9 is a flow chart 900 of a method of wireless communication. The method may be performed by a UE, such as the UE 701. At step 902, the UE receives, from a second base station (e.g., the eNB 703), an indication of resources for detecting a first base station (e.g., the eNB 702). In step 904, the UE receives synchronization signals and an information block from the first base station. The information block includes information indicating whether the first base station is in a dormant state or an active state. The synchronization signals and the information block are received in the indicated resources. The information block includes a cell identifier of the first base station. In step 906, the UE detects the first base station based on the received synchronization signals and on the information indicating whether the first base station is in the dormant state or the active state. When the first base station is in the dormant state, the UE may detect the first base station based on the synchronization signals received in the indicated resources. When the first base station is in the active state, the UE may detect the first base station based synchronization signals received in the indicated resources and additional resources. The additional resources may be utilized by the first base station in the active state, but not the dormant state. In step 908, the UE receives reference signals from the first base station. In step 910, the UE generates a measurement report including at least one of an RSRQ, an RSRP, or an SINR of the received reference signals. In step 912, the UE sends, to the second base station, the measurement report and the cell identifier. In step 914, the UE moves to the first base station from the second base station in a handoff from the second base station to the first base station.

For example, referring to FIG. 7 and FIG. 8, the UE 701 may receive 706, from the eNB 703/802, an indication of resources for detecting the eNB 702/801. The UE 701 may receive (704 and 812 if the eNB 702/801 is dormant, 714 and 804 if the eNB 702/801 is active) synchronization signals and an information block from the eNB 702/801. The information block may include information indicating whether the eNB 702/801 is in a dormant state or an active state. The synchronization signals and the information block may be received in the indicated resources. The information block may include a cell identifier of the eNB 702/801. The UE 701 may detect the eNB 702/801 based on the received synchronization signals and on the information indicating whether the eNB 702/801 is in the dormant state or the active state. When the eNB 702/801 is in the dormant state, the UE 701 may detect the eNB 702/801 based on the synchronization signals received 704/812 in the indicated resources. When the eNB 702/801 is in the active state, the UE 701 may detect the eNB 702/801 based on synchronization signals received 714/804 in the indicated resources and additional resources. The additional resources may be utilized by the eNB 702/801 in the active state, but not the dormant state. The UE 701 may receive reference signals from the eNB 702/801. The UE 701 may generate a measurement report 708 including at least one of an RSRQ, an RSRP, or an SINR of the received reference signals. The UE 701 may send, to the eNB 703/802, the measurement report 708 and the cell identifier. The UE 701 may move (716/718) to the eNB 702/801 from the eNB 703/802 in a handoff from the eNB 703/802 to the eNB 702/801.

The UE may interpret the information block based on the information indicating whether the first base station is in the dormant state or the active state. As such, the UE may detect the first base station in step 906 based on the interpreted information block. Accordingly, when the first base station is in a dormant state, the UE may receive a first set of SI from the first base station, and when the first base station is in an active state, the UE may receive a second set of SI different than the first set of SI from the first base station. Based on the dormant/active indication, the UE may interpret the information received in the information block differently in order to obtain correctly the first or second sets of SI. The UE then utilizes the first or second sets of SI to detect the first base station. The first base station may be detected based on the synchronization signals received at a first periodicity when the information indicates the first base station is in the dormant state and based on the synchronization signals received at a second periodicity when the information indicates the first base station is in the active state. As discussed supra, the second periodicity is greater than the first periodicity. The information block may be a SIB. The information block may be a SIB1. The information block may include a subset of a SIB1, and therefore may be a SIB1 lite. The information block may be a MIB.

Figure 10:
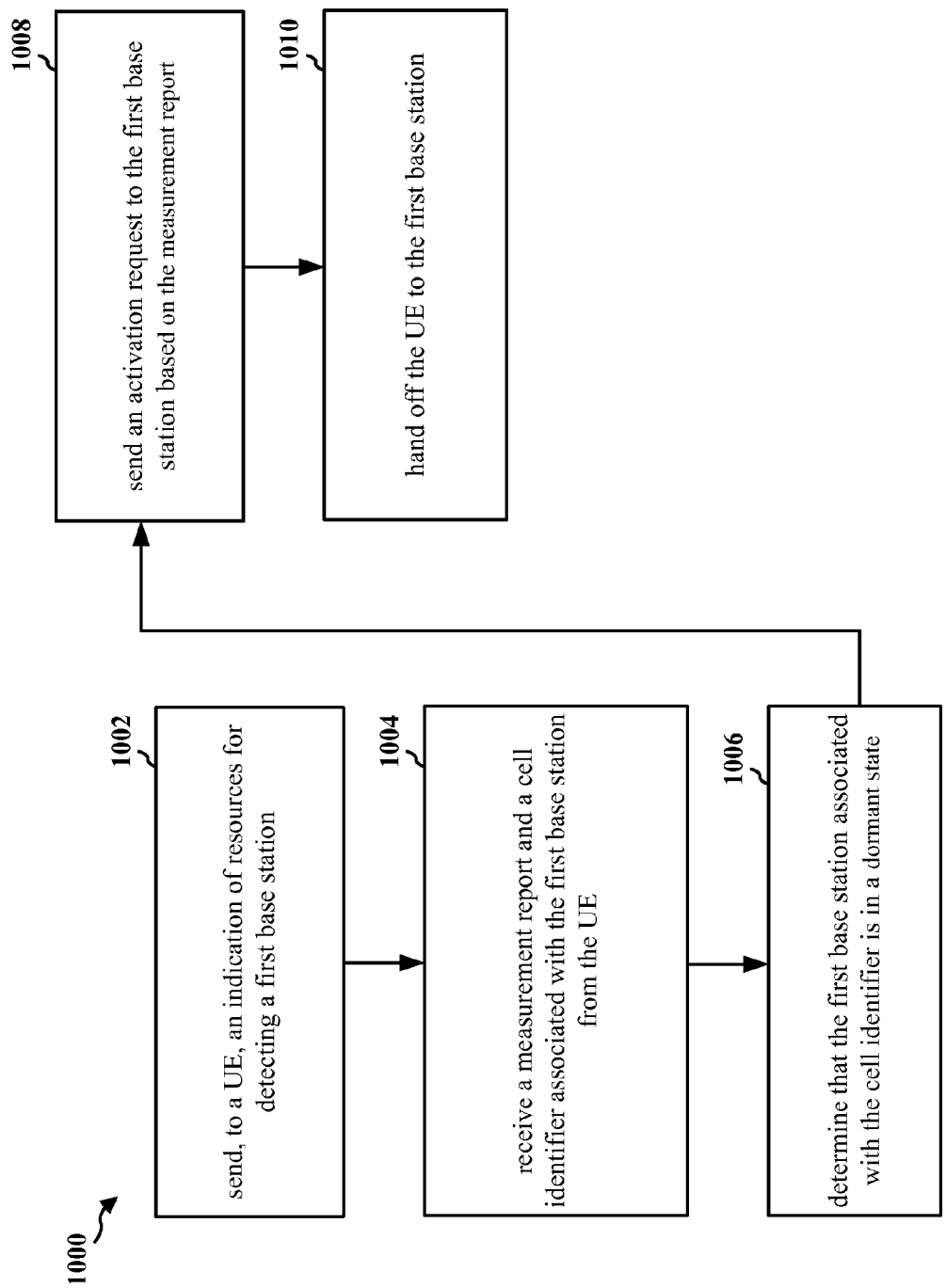
FIG. 10 is a flow chart of a second method of wireless communication.

FIG. 10 is a flow chart 1000 illustrating a method of wireless communication. The method may be performed by a second base station (e.g., active eNB/serving eNB). At step 1002, the second base station sends, to the UE, an indication of resources for detecting a first base station. At step 1004, the second base station receives a measurement report and a cell identifier associated with the first base station from a UE. At step 1006, the second base station determines that the first base station associated with the cell identifier is in a dormant state. At step 1008, the second base station sends an activation request to the first base station based on the measurement report. At step 1010, the second base station hands off the UE to the first base station.

The second base station may configure, within the first base station, subframes utilized by the first base station for data transmissions. The second base station may receive, from the first base station, information indicating that the first base station desires to transition to the dormant state and a configuration of the first base station in the dormant state. In addition, the second base station may send to the first base station a confirmation that the first base station can change from an active state to the dormant state and transmit synchronization signals, reference signals, and an information block according to the received configuration.

For example, referring to FIG. 7 and FIG. 8, the eNB 703/802 may send 706, to the UE 701, an indication of resources for detecting the eNB 702/801. The eNB 703/802 may receive a measurement report 708 and a cell identifier associated with the eNB 702/801 from the UE 701. The eNB 703/802 may determine that the eNB 702/801 associated with the cell identifier is in a dormant state. The eNB 703/802 may send an activation request 710 to the eNB 702/801 based on the measurement report 708. The eNB 703/802 may hand off (716/718) the UE 701 to the eNB 702/801. The eNB 703/802 may configure 712, within the eNB 702/801, subframes utilized by the eNB 702/801 for data transmissions. The eNB 703/802 may receive, from the eNB 702/801, information 808 indicating that the eNB 702/801 desires to transition to the dormant state and a configuration of the eNB 702/801 in the dormant state. In addition, the eNB 703/802 may send to the eNB 702/801 a confirmation 810 that the eNB 702/801 can change from an active state to the dormant state and transmit synchronization signals, reference signals, and an information block according to the received configuration.

Figure 11:
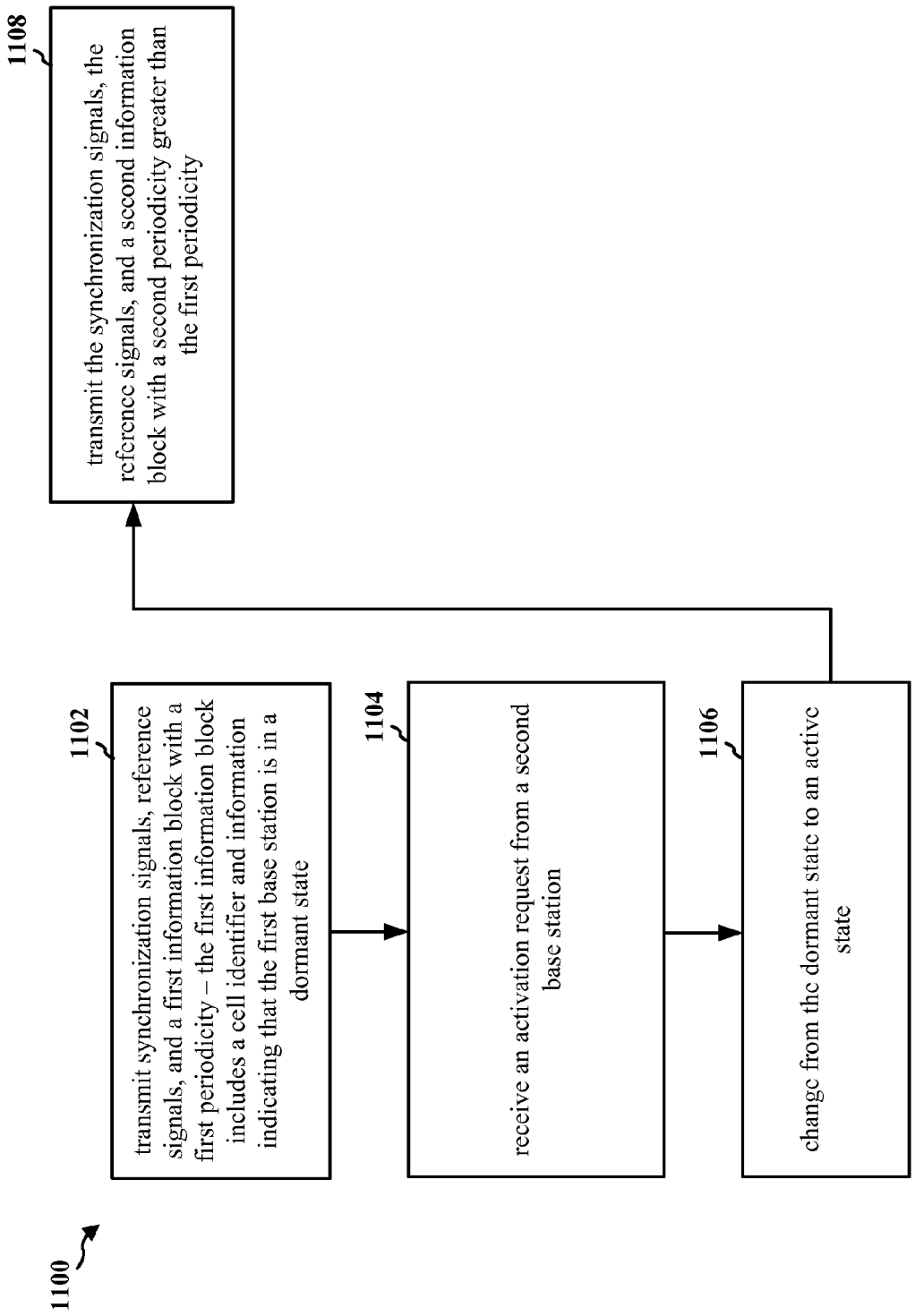
FIG. 11 is a flow chart of a third method of wireless communication.

FIG. 11 is a flow diagram 1100 illustrating a method of wireless communication. The method may be performed by a first base station (e.g., dormant eNB). At step 1102, the first base station transmits synchronization signals, reference signals, and a first information block with a first periodicity. The first information block includes a cell identifier and information indicating that the first base station is in a dormant state. At step 1104, the first base station receives an activation request from a second base station. At step 1106, the first base station changes from the dormant state to an active state. At step 1108, the first base station transmits the synchronization signals, the reference signals, and a second information block with a second periodicity greater than the first periodicity.

The first information block may be a SIB. The information block may be a SIB1. The information block may include a subset of a SIB1. The information block may be a MIB. The second information block may include information indicating that the first base station is in the active state. The second information block may further include at least one of a system bandwidth, downlink control channel configuration information, or a SIB1 assignment. The first base station may receive in a handoff a UE from the second base station. The first base station may receive, from the second base station, a configuration for subframes to utilize in data transmissions with the UE. The first base station may determine that the first base station has been inactive for a time period greater than a threshold, change from the active state to the dormant state, and transmit the synchronization signals, the reference signals, and the first information block with the first periodicity. The first base station may send to the second base station information indicating that the first base station desires to change from the active state to the dormant state and information indicating the first periodicity at which the synchronization signals, the reference signals, and the first information block will be transmitted. In addition, the first base station may receive, from the second base station, information confirming that the first base station can change from the active state to the dormant state and transmit the synchronization signals, the reference signals, and the first information block with the first periodicity.

For example, referring to FIG. 7 and FIG. 8, the eNB 702/801 may transmit 704/812 synchronization signals, reference signals, and a first information block with a first periodicity. The first information block may include a cell identifier and information indicating that the eNB 702/801 is in a dormant state. The eNB 702/801 may receive an activation request 710 from the eNB 703/802. The eNB 702/801 may change from the dormant state to an active state. The eNB 702/801 may transmit 714/804 the synchronization signals, the reference signals, and a second information block with a second periodicity greater than the first periodicity. The first information block may be a SIB. The information block may be a SIB1. The information block may include a subset of a SIB1. The information block may be a MIB. The second information block may include information indicating that the eNB 702/801 is in the active state. The second information block may further include at least one of a system bandwidth, downlink control channel configuration information, or a SIB1 assignment. The eNB 702/801 may receive in a handoff (718) a UE 701 from the eNB 703/802. The eNB 702/801 may receive, from the eNB 703/802, a configuration 712 for subframes to utilize in data transmissions with the UE 701. The eNB 702/801 may determine that the eNB 702/801 has been inactive for a time period greater than a threshold (based on inactivity timer 806), change from the active state to the dormant state, and transmit 704/812 the synchronization signals, the reference signals, and the first information block with the first periodicity. The eNB 702/801 may send to the eNB 703/802 information 808 indicating that the eNB 702/801 desires to change from the active state to the dormant state and information indicating the first periodicity at which the synchronization signals, the reference signals, and the first information block will be transmitted. In addition, the eNB 702/801 may receive, from the eNB 703/802, information 810 confirming that the eNB 702/801 can change from the active state to the dormant state and transmit the synchronization signals, the reference signals, and the first information block with the first periodicity.

Figure 12:
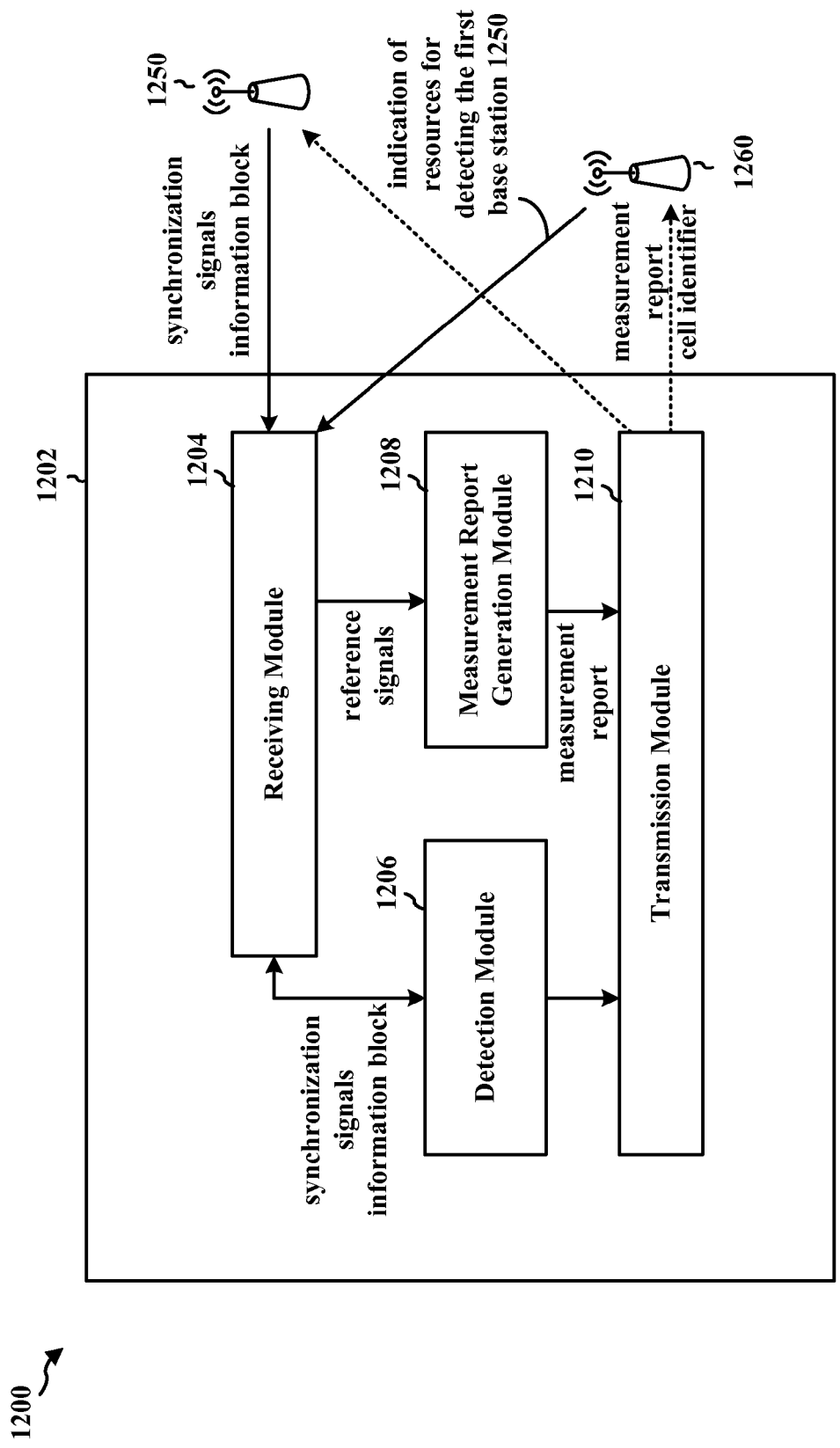
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a UE. The apparatus includes a receiving module 1204 that is configured to receive synchronization signals and an information block from a first base station 1250. The information block includes information indicating whether the first base station 1250 is in a dormant state or an active state. The apparatus further includes a detection module 1206 that is configured to detect the first base station 1250 based on the received synchronization signals and on the information indicating whether the first base station is in the dormant state or the active state. The receiving module 1204 may be configured to receive, from a second base station 1260, an indication of resources for detecting the first base station 1250. The synchronization signals and the information block may be received in the indicated resources. The information block may further include a cell identifier. The receiving module 1204 may be further configured to receive reference signals from the first base station 1250. The apparatus may further include a measurement report generation module 1208 that is configured to generate a measurement report including at least one of an RSRQ, an RSRP, or an SINR of the received reference signals. The apparatus may further include a transmission module 1210 that is configured to send, to the second base station 1260, the measurement report and the cell identifier. The apparatus may be configured to move to the first base station from a second base station in a handoff from the second base station to the first base station. The detection module 1206 may be configured to interpret the information block based on the information indicating whether the first base station is in the dormant state or the active state. The detection module 1206 may be configured to perform the detection based on the interpreted information block. The first base station 1250 may be detected based on the synchronization signals received at a first periodicity when the information indicates the first base station 1250 is in the dormant state and based on the synchronization signals received at a second periodicity when the information indicates the first base station 1250 is in the active state. The second periodicity is greater than the first periodicity. The information block may be a SIB. The information block may be a SIB1. The information block may include a subset of a SIB1. The information block may be a MIB.

The apparatus may include additional modules that perform each of the steps of the algorithm in the aforementioned flow charts of FIG. 9. As such, each step in the aforementioned flow chart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
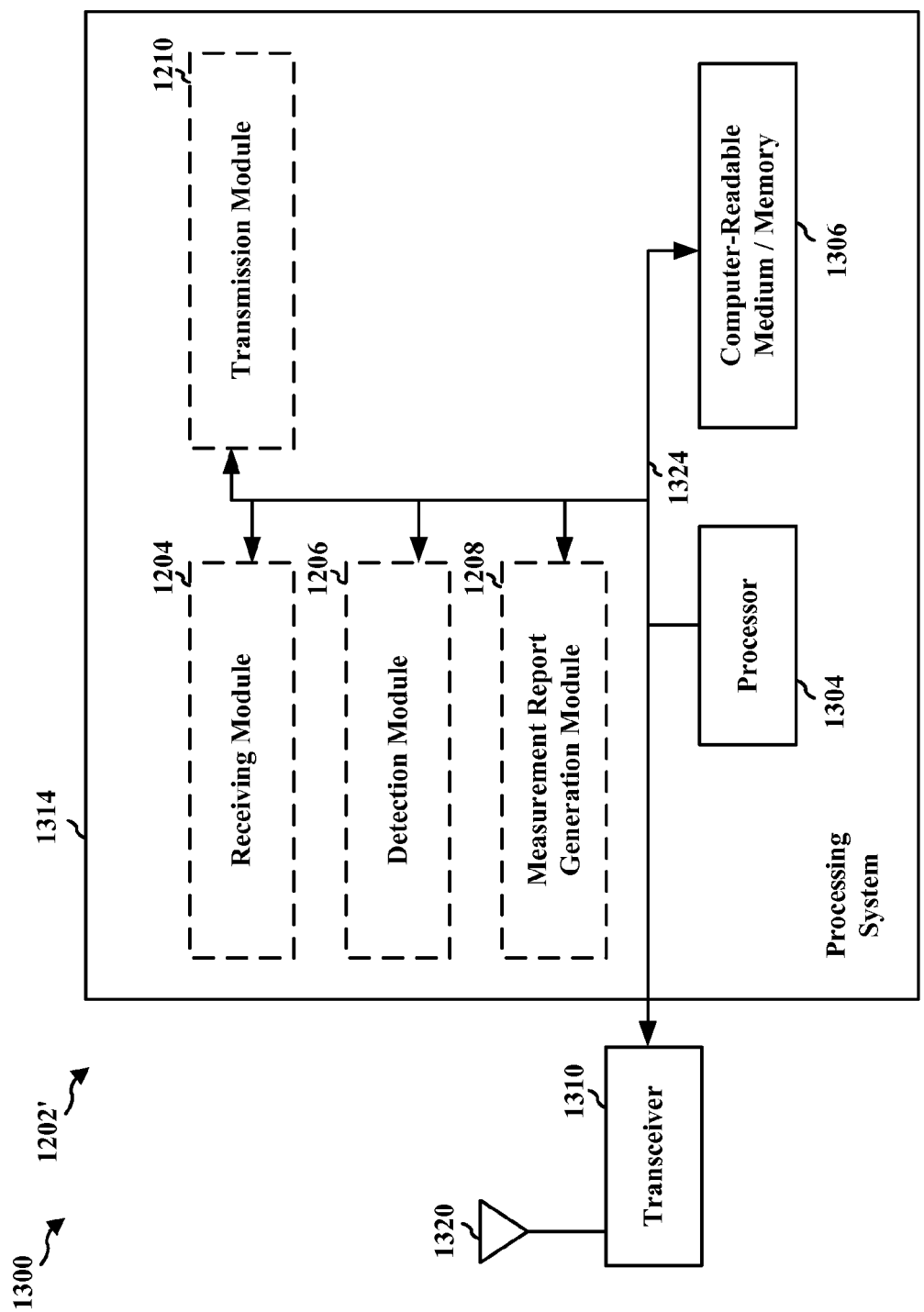
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314. In addition, the transceiver 1310 receives information from the processing system 1314, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the modules 1204, 1206, 1208, 1210. The modules may be software modules running in the processor 1304, resident/stored in the computer readable medium/memory 1306, one or more hardware modules coupled to the processor 1304, or some combination thereof. The processing system 1314 may be a component of the UE 650 and may include the memory 660 and/or at least one of the TX processor 668, the RX processor 656, and the controller/processor 659.

In one configuration, the apparatus 1202/1202' for wireless communication includes means for receiving synchronization signals and an information block from a first base station. The information block includes information indicating whether the first base station is in a dormant state or an active state. The apparatus further includes means for detecting the first base station based on the received synchronization signals and on the information indicating whether the first base station is in the dormant state or the active state. The apparatus may further include means for receiving, from a second base station, an indication of resources for detecting the first base station. The synchronization signals and the information block may be received in the indicated resources. The information block may further include a cell identifier. The apparatus may further include means for receiving reference signals from the first base station. The apparatus may further include means for generating a measurement report including at least one of an RSRQ, an RSRP, or an SINR of the received reference signals. The apparatus may further include means for sending, to a second base station, the measurement report and the cell identifier. The apparatus may further include means for moving to the first base station from a second base station in a handoff from the second base station to the first base station. The apparatus may further include means for interpreting the information block based on the information indicating whether the first base station is in the dormant state or the active state. The means for detecting may perform the detection based on the interpreted information block.

The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a second base station, comprising:
   receiving a measurement report and a cell identifier, associated with a first base station, from a user equipment (UE) that is served by the second base station, the second base station being in an active state;
   determining, based on the cell identifier, that the first base station is in a dormant state;
   sending an activation request to the first base station, based on the measurement report, to prompt the first base station to transition from the dormant state to an active state, wherein the activation request includes a configuration of a second periodicity at which the first base station transmits synchronization signals and an information block in the active state, the second periodicity being greater than a first periodicity at which the first base station transmits the synchronization signals and the information block in the dormant state; and
   handing off the UE to the first base station.

2. The method of claim 1, further comprising sending, to the UE, an indication of resources for detecting the first base station.

3. The method of claim 2, wherein the indication of resources indicates resources allocated for carrying synchronization signals and an information block of the first base station, the information block comprising information indicating whether the first base station is in the dormant state or the active state.

4. The method of claim 3, wherein the information block is a system information block (SIB) or a master information block (MIB).

5. The method of claim 4, wherein the information block is the SIB and wherein the SIB comprises at least a subset of a SIB 1 (SIB1).

6. The method of claim 1, further comprising:
   receiving, from the first base station, information indicating an intent of the first base station to transition to the dormant state and a first configuration of the first base station in the dormant state; and
   sending, to the first base station, a second configuration that enables the first base station to transition from the active state to the dormant state and to transmit synchronization signals, reference signals, an information block, or any combination thereof, according to the second configuration.

7. The method of claim 1, wherein the measurement report is determined based on reference signals of the first base station and comprises a reference signal received quality (RSRQ), a reference signal received power (RSRP), a signal to interference plus noise ratio (SINR), or any combination thereof.

8. An apparatus for wireless communication, the apparatus being a second base station, comprising:
   means for receiving a measurement report and a cell identifier, associated with a first base station, from a user equipment (UE) that is served by the second base station, the second base station being in an active state;
   means for determining, based on the cell identifier, that the first base station is in a dormant state;

means for sending an activation request to the first base station, based on the measurement report, to prompt the first base station to transition from the dormant state to an active state, wherein the activation request includes a configuration of a second periodicity at which the first base station transmits synchronization signals and an information block in the active state, the second periodicity being greater than a first periodicity at which the first base station transmits the synchronization signals and the information block in the dormant state; and means for sending a handoff of the UE to the first base station.

9. The apparatus of claim 8, further comprising means for sending, to the UE, an indication of resources for detecting the first base station.

10. The apparatus of claim 9, wherein the indication of resources indicates resources allocated for carrying synchronization signals and an information block of the first base station, the information block comprising information indicating whether the first base station is in the dormant state or the active state.

11. The apparatus of claim 10, wherein the information block is a system information block (SIB) or a master information block (MIB).

12. The apparatus of claim 11, wherein the information block is the SIB and wherein the SIB comprises at least a subset of a SIB 1 (SIB1).

13. The apparatus of claim 8, further comprising:
means for receiving, from the first base station, information indicating an intent of the first base station to transition to the dormant state and a first configuration of the first base station in the dormant state; and
means for sending, to the first base station, a second configuration that enables the first base station to transition from the active state to the dormant state and to transmit synchronization signals, reference signals, an information block, or any combination thereof, according to the second configuration.

14. The apparatus of claim 8, wherein the measurement report is determined based on reference signals of the first base station and comprises a reference signal received quality (RSRQ), a reference signal received power (RSRP), a signal to interference plus noise ratio (SINR), or any combination thereof.

15. An apparatus for wireless communication, the apparatus being a second base station, comprising:
a memory; and
at least one processor coupled to the memory and configured to:
receive a measurement report and a cell identifier, associated with a first base station, from a user equipment (UE) that is served by the second base station, the second base station being in an active state;
determine, based on the cell identifier, that the first base station is in a dormant state;
send an activation request to the first base station, based on the measurement report, to prompt the first base station to transition from the dormant state to an active state, wherein the activation request includes a configuration of a second periodicity at which the first base station transmits synchronization signals and an information block in the active state, the second periodicity being greater than a first periodicity at which the first base station transmits the synchronization signals and the information block in the dormant state; and
hand off the UE to the first base station.

16. The apparatus of claim 15, wherein the at least one processor is further configured to send, to the UE, an indication of resources for detecting the first base station.

17. The apparatus of claim 16, wherein the indication of resources indicates resources allocated for carrying synchronization signals and an information block of the first base station, the information block comprising information indicating whether the first base station is in the dormant state or the active state.

18. The apparatus of claim 17, wherein the information block is a system information block (SIB) or a master information block (MIB).

19. The apparatus of claim 18, wherein the information block is the SIB and wherein the SIB comprises at least a subset of a SIB 1 (SIB1).

20. The apparatus of claim 15, wherein the at least one processor is further configured to:
receive, from the first base station, information indicating an intent of the first base station to transition to the dormant state and a first configuration of the first base station in the dormant state; and
send, to the first base station, a second configuration that enables the first base station to transition from the active state to the dormant state and to transmit synchronization signals, reference signals, an information block, or any combination thereof, according to the second configuration.

21. The apparatus of claim 15, wherein the measurement report is determined based on reference signals of the first base station and comprises a reference signal received quality (RSRQ), a reference signal received power (RSRP), a signal to interference plus noise ratio (SINR), or any combination thereof.

22. A non-transitory computer-readable medium storing computer executable code for a second base station, comprising code to:
receive a measurement report and a cell identifier, associated with a first base station, from a user equipment (UE) that is served by the second base station, the second base station being in an active state;
determine, based on the cell identifier, that the first base station is in a dormant state;
send an activation request to the first base station, based on the measurement report, to prompt the first base station to transition from the dormant state to an active state, wherein the activation request includes a configuration of a second periodicity at which the first base station transmits synchronization signals and an information block in the active state, the second periodicity being greater than a first periodicity at which the first base station transmits the synchronization signals and the information block in the dormant state; and
hand off the UE to the first base station.

23. The non-transitory computer-readable medium of claim 22, further comprising code to send, to the UE, an indication of resources for detecting the first base station.

24. The non-transitory computer-readable medium of claim 23, wherein the indication of resources indicates resources allocated for carrying synchronization signals and an information block of the first base station, the information block comprising information indicating whether the first base station is in the dormant state or the active state.

25. The non-transitory computer-readable medium of claim 24, wherein the information block is a system information block (SIB) or a master information block (MIB).

26. The non-transitory computer-readable medium of claim 25, wherein the information block is the SIB and wherein the SIB comprises at least a subset of a SIB 1 (SIB1).

27. The non-transitory computer-readable medium of claim 22, further comprising code to:
   receive, from the first base station, information indicating an intent of the first base station to transition to the dormant state and a first configuration of the first base station in the dormant state; and
   send, to the first base station, a second configuration that enables the first base station to transition from the active state to the dormant state and to transmit synchronization signals, reference signals, an information block, or any combination thereof, according to the second configuration.

* * * * *